US006862789B1

(12) United States Patent
Hering et al.

(10) Patent No.: US 6,862,789 B1
(45) Date of Patent: Mar. 8, 2005

(54) ASSEMBLY TOOL

(76) Inventors: Martin Hering, 8055 Lexington Pl., Apt. #5, Pleasant Prairie, WI (US) 53158-2513; Karl Aage Lindholm Jensen, Markledet 20, DK-5220 Odense (DK)

( * ) Notice: Subject to any disclaimer, the term of this patent is extended or adjusted under 35 U.S.C. 154(b) by 0 days.

(21) Appl. No.: 10/111,884
(22) PCT Filed: Sep. 28, 2000
(86) PCT No.: PCT/EP00/09471
 § 371 (c)(1),
 (2), (4) Date: Dec. 26, 2002
(87) PCT Pub. No.: WO01/32353
 PCT Pub. Date: May 10, 2001

(30) Foreign Application Priority Data
 Nov. 5, 1999 (DE) .......................................... 199 53 475
(51) Int. Cl.[7] .............................................. B23P 11/02
(52) U.S. Cl. ........................................... 29/235; 29/252
(58) Field of Search ......................... 29/235, 451, 252, 29/450

(56) References Cited
U.S. PATENT DOCUMENTS 3,981,066 A * 9/1976 Calvert ........................ 29/235

* cited by examiner

Primary Examiner—Robert C. Watson
(74) Attorney, Agent, or Firm—Michael J. Striker

(57) ABSTRACT

The invention relates to an assembly tool for assembling a sealing ring (3) in an annular groove (4, 9) of a machine part (1, 7), in particular of a valve plate (7). By the provision that the assembly tool (10, 23) includes a pneumatic piston-cylinder unit (11, 12, 26, 27) for uniformly press-fitting the sealing ring (3) into the annular groove (4, 9), a simple assembly tool that is economical to make, is versatile to use and can be used in mobile application, and nevertheless enables reliable seal assembly without injuring anyone.

7 Claims, 2 Drawing Sheets

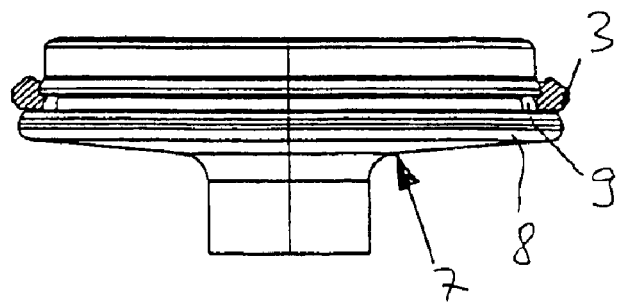
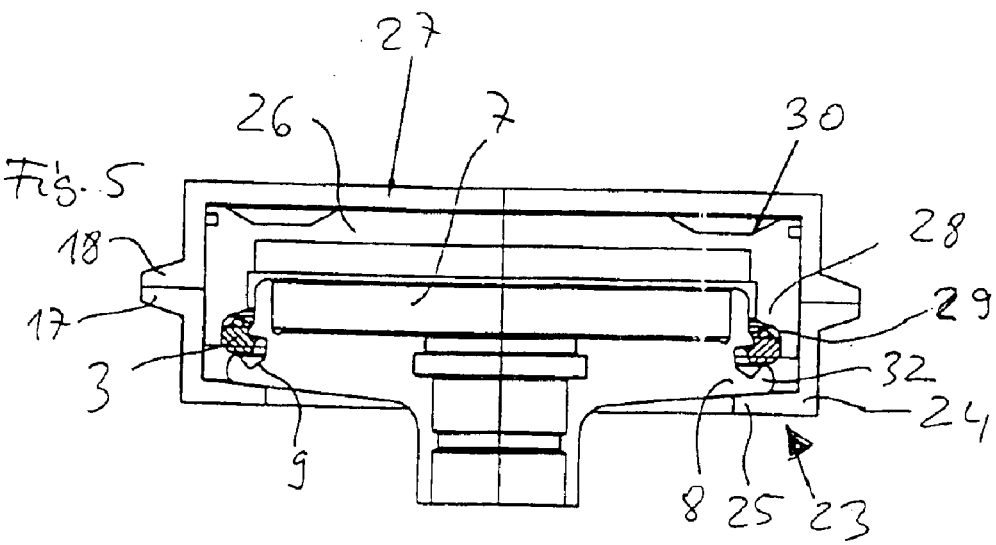
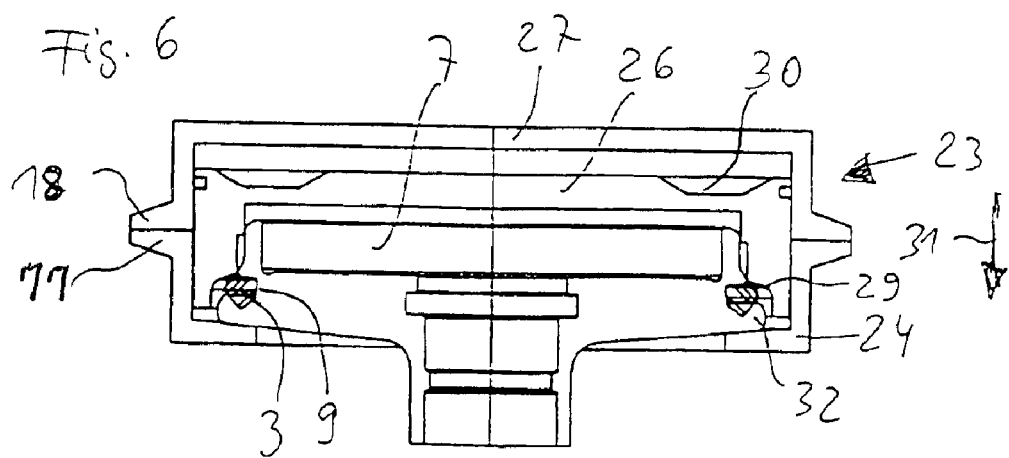

ASSEMBLY TOOL

BACKGROUND OF THE INVENTION

The invention relates to an assembly tool for assembling a sealing ring in an annular groove of a machine part, in particular of a valve plate.

There are already known assembly tools in which the seal is press-fitted into the sealing groove by a hydraulic press. Such hydraulic presses are complicated and expensive to produce. Moreover, they are large and heavy and are accordingly not easy to transport. For this reason, the user typically procures only a single such device and installs it at some central point in a repair and maintenance facility. This in turn requires that the individual machine parts, such as valve plates, be brought to the central maintenance facility, so that the new sealing rings can be inserted there, in order for the seals to be refurbished.

From U.S. Pat. No. 4,550,486, a power tool is known that is intended to mounting a sealing ring in a tool bore and is arranged such that the sealing ring, which has two different axial sides, can be installed only in the correct orientation. The power tool has a piston, which is axially displaceable in a cylinder and is under spring tension. For installing the sealing ring is first thrust by hand onto the piston in the axial direction. If the orientation is wrong, this creates such strong axial forces that the piston retracts back into the cylinder counter to the spring tension, resulting in a failed installation of the sealing ring. If the sealing ring is oriented correctly, the ring is now on the piston and in contact with a radial protrusion of the cylinder. The power tool is then, by a hand motion, pressed against the tool to be equipped with the sealing ring, and a central bolt of the power tool is introduced into a centering opening of the tool. As contact pressure continues to be exerted, the radial protrusion of the now-centered cylinder pushes the sealing ring axially into the tool opening, thus completing the assembly. However, the known assembly tool is unsuitable for installing sealing rings that must be pressed at least partially radially inward into an outer annular groove of the tool to be outfitted and must therefore be deformed in a special way.

The same is true for the assembly tools known from International Patent Disclosure WO 99/07513 and U.S. Pat. No. 5,956,830. While these are both suitable for automatic sealing ring installation and can optionally be equipped with a pneumatic piston-cylinder unit, nevertheless the sealing rings can be press-fitting into suitably shaped annular grooves only in an axial direction. Radially outer annular grooves, for instance, a valve plates cannot be outfitted using the known tools.

SUMMARY OF THE INVENTION

Accordingly, it is an object of the present invention to provide an assembly tool which is suitable for installing sealing rings in an annular groove located on the outside of an outward-protruding tool part.

According to the invention, this object is attained in that the pneumatic piston-cylinder unit has a work piston with an axially protruding, annular assembly portion, which by subjecting the piston-cylinder unit to compressed air press-fits a sealing ring uniformly into the annular groove; that the work piston of the assembly tool can be braced axially on one axial side of the sealing portion of the machine part or on the sealing ring; and that the assembly tool has at least one flange part, with a support portion that can be braced axially on the other axial side of the sealing portion or on the sealing ring and with a flange portion that can be connected solidly for the sake of sealing assembly to a corresponding flange portion of the cylindrical part.

The pneumatic piston-cylinder unit of the invention relieves the mechanic of the laborious work and reduces the risk of injury. By the simultaneous press-fitting of the sealing ring, on the one hand damage can be avoided, and on the other a correct seat of the press-fitted sealing ring can be assured. The assembly tool of the invention need not be stationed at some central point, because in contrast to known, hydraulically driven tools, a pneumatic drive can be connected on-site to the compressed air supply lines that are present anyway in factory buildings. The assembly tool can therefore be simple in design, which reduces the production and maintenance costs and improves its reliability in heavy-duty everyday use. Moreover, the assembly tool of the invention can be transported easily and conveniently. The disposition of the flange part and support portion enables secure, solid positioning of the assembly tool on the machine part, thereby assuring correct installation of the sealing ring without damaging it.

In an advantageous feature of the invention, the annular assembly portion of the work piston is provided, on the radially inner side of its free end, with an encompassing recess for guiding the sealing ring, and the flanks of the recess are chamfered such that upon an axial displacement of the work piston, they compress the sealing ring on one side and press it into the annular groove on the other.

In an advantageous feature of the invention, the annular assembly portion of the work piston is provided, on the radially inner side of its free end, with an encompassing recess for guiding the sealing ring, and the flanks of the recess are chamfered such that upon an axial displacement of the work piston, they compress the sealing ring on one side and press it into the annular groove on the other.

The aforementioned embodiment can be used especially advantageously in conjunction with an improved ring seal, designed especially for automated assembly by the assembly tool of the invention, in which seal the sealing ring has two encompassing protrusions, which are disposed parallel to one another such that they form a recess of V-shaped cross section between them.

The sealing ring thus designed is premounted on the annular groove in such a way that the V-shaped recess is open toward the annular groove. During the automated assembly with the assembly tool, the sealing ring is first compressed by the work piston, so that the V-shaped recess closes. The thus-compressed sealing ring is imparted, from one edge or preferably from a chamfered flank of the work piston, with a radially inward-oriented force component, by which the sealing ring is pressed into the annular groove. The cross section of the annular groove is preferably widened toward the bottom of the groove, so that the elastically expanding cross section of the sealing ring inside the annular groove anchors the sealing ring firmly in the annular groove.

In an advantageous feature of the invention, an assembly tool suited in particular for use with a machine part in which an annular groove is located on the outside of a sealing portion, has a work piston that can be braced on one axial side of the sealing portion of the machine part or on the sealing ring. The assembly tool furthermore has at least one flange part, with a support portion that can be braced axially on the other axial side of the sealing portion or on the sealing ring and with a flange portion that can be connected solidly for the sake of sealing assembly to a corresponding flange portion of the cylindrical part. These provisions make secure, firm positioning of the assembly tool to the machine part possible, and as a result the correct assembly of the sealing ring without damage to it is assured.

For releasable connection of the aforementioned flange portions of the cylindrical part and the flange part, a clamp is preferably provided, in particular a profiled cuff-type connection, which can be installed simply and removed again equally easily after use.

In an advantageous feature of the invention, it is provided that the applicable flange portion of the cylindrical part and flange part is embodied in the form of a standard flange of the kind known for connecting valves and pipes, and the clamp is embodied in the form of an associated known standard clamp. In this embodiment, it is advantageously possible to use easily procured standard parts, and in particular the standard clamp. Not only does this make procurement of the parts more economical. It is also advantageous that the user of the assembly tool is typically familiar with handling the standard flanges and the standard clamp. As a result, the handling can be done quickly and without mistakes from the very outset.

In an advantageous embodiment, the flange part is embodied annularly around a radially inner recess. This allows it to be used in such machine parts as valve plates, which are solidly connected to axially extending actuating rods or the like. On such machine parts, the annular flange part can be mounted in such a way that the axially protruding actuating rods protrude through its radially inner recess.

For the same reason, an embodiment can be advantageous in which the cylindrical part and the work piston are embodied annularly around an inner recess.

Another embodiment provides that the cylindrical part and the work piston are embodied as cup-shaped. This embodiment is simpler to produce but can be considered only for machine parts of the kind that have no substantial axial protrusion on the axial side on which the piston-cylinder unit is to be mounted. This is true for instance for flat valve plates, which are connected to an actuating rod only on the other axial side.

In a method for assembling a sealing ring in an outer annular groove of a machine part, in particular of a valve plate, using an assembly tool of the above-described part, the following method steps are provided:

The sealing ring is premounted by hand on the machine part, so that it rests on the outside of the annular groove;
- a pneumatic piston-cylinder unit is placed and firmly retained on one axial side of the machine part on this part or on the sealing ring;
- a flange part is placed on the other axial side of the machine part on that part or on the sealing ring and solidly connected to the piston-cylinder unit by means of a clamp;
- the piston-cylinder unit is subjected to compressed air, so that the work piston, with its axially protruding, annular assembly portion, press-fits the sealing ring uniformly into the annular groove;
- the assembly tool is removed from the machine part, preferably after a pressure relief of the piston-cylinder unit and after release of the clamp.

BRIEF DESCRIPTION OF THE DRAWINGS

FIG. 2, the closing element of FIG. 1, with an assembly tool secured to it, in a first embodiment, before the sealing ring is press-fitted in;

FIG. 4, a view corresponding to FIG. 1 of a valve plate;

FIG. 5, the valve plate of FIG. 4, with an assembly tool secured in it, in a second embodiment, before the press-fitting of the sealing ring;

FIG. 6, the same as FIG. 5, but after the press-fitting of the sealing ring.

DESCRIPTION OF THE PREFERRED EMBODIMENTS

Figure 1:
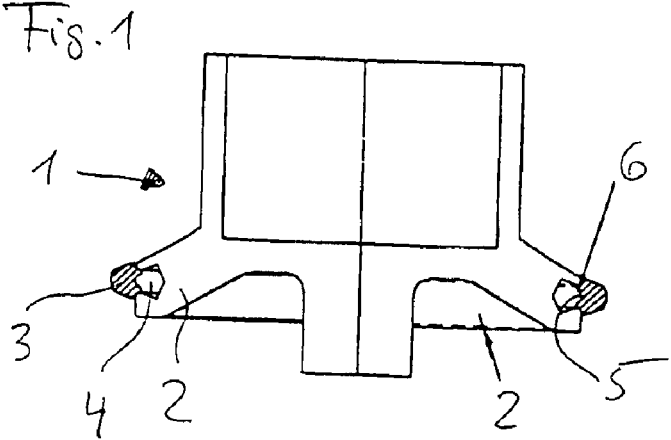
FIG. 1, a sectional view of a closing element for a valve, with a preassembled sealing ring.

FIG. 1, a closing element 1 can be seen of a double-seat valve, not otherwise shown, of the kind used in the foods industry for handling, for instance for dispensing pastelike foods into containers. The closing element 1 has an encompassing, obliquely radially outward-protruding sealing portion 2, which is provided with an annular groove 4 that is open radially outward.

A sealing ring 3 used here differs from simple O-ring seals in having two encompassing protrusions 6, which are disposed parallel to one another in such a way that between them they form a recess 5 of V-shaped cross section.

Figure 2:
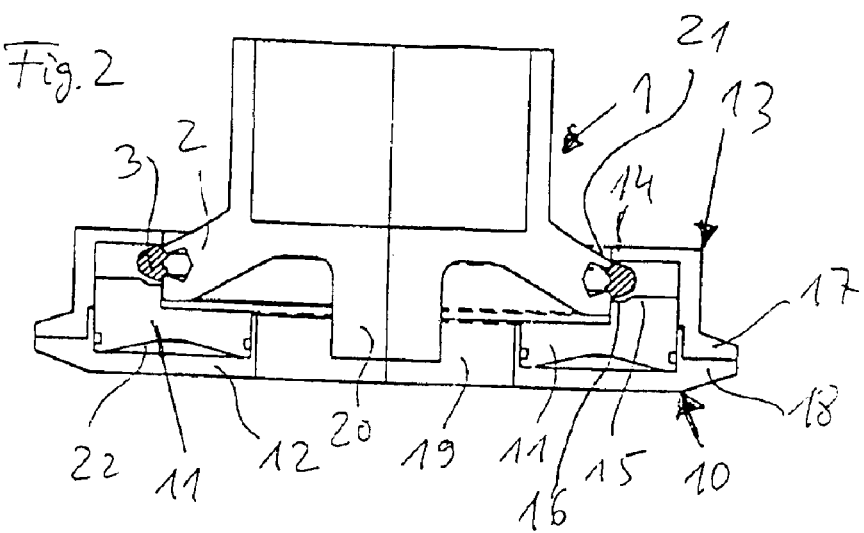

In FIG. 2, an assembly tool 10 can be seen, secured to the closing element 1. The assembly tool comprises an annular work piston 11, which is disposed axially displaceably in a likewise annular cylindrical part 12, and a flange part 13; the sealing ring 3 is clamped in place between a support portion 14 of the flange part 13 and an axially protruding, annular assembly portion 15 of the work piston 11. For better guidance during the assembly, the assembly portion 15 of the work piston 11 has an encompassing recess 16 on the radially inner side.

The flange part 13 has a radially outward-protruding flange portion 17, which can be connected solidly to a corresponding flange portion 18 of the cylindrical part 12. The flange portions 17, 18 are designed in the form of known standard flanges and are held together by a standard clamp, not shown.

There is space in an inner recess 19 of the cylindrical part 12 for an axially protruding portion 20 of the closing element 1, whose sealing portion 2 is disposed inside a radially inner recess 21 of the flange part 13.

Figure 3:
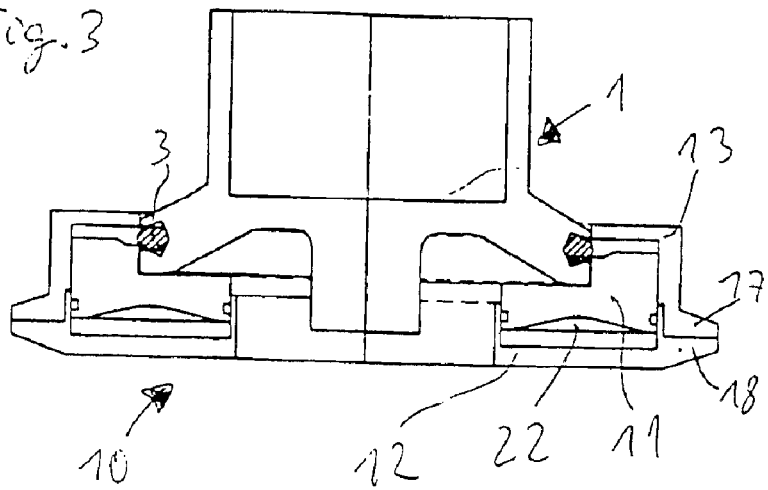
FIG. 3, the same as FIG. 2, but after the press-fitting of the sealing ring.

FIG. 2 shows the situation after the positioning of the assembly tool 10 on the closing element 1. For assembling the sealing ring 3, the interior 22 of the piston-cylinder unit 11, 12 is now subjected to compressed air; the sealing ring 3 is initially axially compressed between the assembly portion 15 of the work piston 11 and the support portion 14 of the flange part 13 and is finally pressed radially into the annular groove 4. This situation is shown in FIG. 3. The annular groove 4 widens radially inward in the axial direction, so that the sealing ring 3 can expand elastically in the interior of the annular groove 4 and thus be firmly anchored in the annular groove 4.

After the release of a standard clamp, not shown, which has joined the two standard flanges 17, 18 firmly to one another during the press-fitting process, the piston-cylinder unit 11, 12 on the one hand and the flange part 13 on the other can be removed from the closing element 1. The assembly of the sealing ring 3 is thus completed.

FIG. 4 shows a valve closing element, embodied as a valve plate 7, in which a radially outward-protruding sealing portion 8 is provided with an asymmetrical annular groove 9.

FIG. 5 shows a modified assembly tool 23, which likewise includes a piston-cylinder unit and a flange part 24. The flange part 24 again has a support portion 25, which contacts one axial side of the sealing portion 8 of the valve plate 7. The piston-cylinder unit comprises an essentially cup-shaped work piston 26, which is disposed axially displaceably in a likewise cup-shaped cylindrical part 27. The work piston 26 furthermore has an axially protruding, annular assembly portion 28, which on its radially inner side has an encompassing recess 29 for guiding the sealing ring 3.

FIG. 5 shows the situation after the positioning of the assembly tool 23 on the valve plate 7. For assembling the sealing ring 3, the interior 30 of the piston-cylinder unit 26, 27 is now subjected to compressed air, as a consequence of which the work piston 26 moves in the direction of the arrow 31, as shown in FIG. 6. In the process, the sealing ring 3 is compressed between the recess 29 of the work piston 26 and a radially far-protruding groove wall 32 of the sealing portion 8 embodied on the valve plate 7 and is pressed both obliquely downward and radially inward into the annular groove 9.

After the release of a standard clamp, not shown, which has firmly joined the two standard flanges 17, 18 to one another during the press-fitting operation, the piston-cylinder unit 26, 27 on the one hand and the flange part 24 on the other can be removed from the valve plate 7. The assembly of the sealing ring 3 is thus completed.

LIST OF REFERENCE NUMERALS

1 Closing element
2 Sealing portion
3 Sealing ring
4 Annular groove
5 Recess
6 Protrusion
7 Valve plate
8 Sealing portion
9 Annular groove
10 Assembly tool
11 Work piston
12 Cylindrical part
13 Flange part
14 Support portion
15 Assembly portion
16 Recess
17 Flange portion
18 Flange portion
19 Recess
20 Portion
21 Recess
22 Interior
23 Assembly tool
24 Flange part
25 Support portion
26 Work piston
27 Cylindrical part
28 Assembly portion
29 Recess
30 Interior
31 Direction of arrow
32 Groove wall

What is claimed is:

1. An assembly tool for assembling a sealing ring in an annular groove located on an outside of a radially outward-protruding sealing portion of a machine part, the assembly tool comprising a pneumatic piston-cylinder unit for uniformly pressing the sealing ring into the annular groove, said pneumatic cylinder-piston unit having a work piston which is braceable axially on an axial side of the sealing portion of the machine part or the sealing ring; at least one flange part with a support portion that is axially braceable on another axial side of the sealing portion of the machine part or said sealing ring; and a flange portion which for sealing assembly is connectable solidly to a flange portion of a cylindrical part of said piston-cylinder unit.

2. An assembly tool for assembling a sealing ring in an annular groove located on an outside of a radially outward-protruding sealing portion of a machine part, the assembly tool comprising a pneumatic piston-cylinder unit for uniformly pressing the sealing ring into the annular groove, said pneumatic cylinder-piston unit having a work piston which is braceable axially on an axial side of the sealing portion of the machine part or the sealing ring; at least one flange part with a support portion that is axially braceable on another axial side of the sealing portion of the machine part or said sealing ring; and a flange portion which for sealing assembly is connectable solidly to a flange portion of a cylindrical part of said piston-cylinder unit, wherein said work piston has an annular assembly portion which has a free end and is provided on a radially inner side of said free end with an encompassing recess for guiding said sealing ring, said encompassing recess having flanks which are chamfered such that upon an axial displacement of said work piston said flanks compress said sealing ring on one side and press said sealing ring into said annular groove on another side.

3. An assembly tool for assembling a sealing ring in an annular groove located on an outside of a radially outward-protruding sealing portion of a machine part, the assembly tool comprising a pneumatic piston-cylinder unit for uniformly pressing the sealing ring into the annular groove, said pneumatic cylinder-piston unit having a work piston which is braceable axially on an axial side of the sealing portion of the machine part or the sealing ring; at least one flange part with a support portion that is axially braceable on another axial side of the sealing portion of the machine part or said sealing ring; and a flange portion which for sealing assembly is connectable solidly to a flange portion of a cylindrical part of said piston-cylinder unit; and further comprising a clamp for separable connections of said flange portions of said cylindrical part and said flange part.

4. An assembly tool as defined in claim 3, wherein said flange portions of said cylindrical part and said flange part are each formed as a flange, said clamp being formed as an associated clamp.

5. An assembly for assembling a sealing ring in an annular groove located on an outside of a radially outward-protruding sealing portion of a machine part, the assembly tool comprising a pneumatic piston-cylinder unit for uniformly pressing the sealing ring into the annular groove, said pneumatic cylinder-piston unit having a work piston which is braceable axially on an axial side of the sealing portion of the machine part or the sealing ring; at least one flange part with a support portion that is axially braceable on another axial side of the sealing portion of the machine part or said sealing ring; and a flange portion which for sealing assembly is connectable solidly to a flange portion of a cylindrical part of said piston-cylinder unit, wherein said flange part is formed annularly around a radially inner recess.

6. An assembly tool for assembling a sealing ring in an annular groove located on in outside of a radially outward-protruding sealing portion of a machine part, the assembly tool comprising a pneumatic piston-cylinder unit for uniformly pressing the sealing ring into the annular groove, said pneumatic cylinder-piston unit having a work piston which is braceable axially on an axial side of the sealing portion of the machine part or the sealing ring; at least one flange part with a support portion that is axially braceable on another axial side of the sealing portion of the machine part or said sealing ring; and a flange portion which for sealing assembly is connectable solidly to a flange portion of a cylindrical part of said piston-cylinder unit, wherein said cylindrical part and said work piston are formed annularly around an inner recess.

7. An assembly tool for assembling a sealing ring in an annular groove located on an outside of a radially outward-protruding sealing portion of a machine part, the assembly tool comprising a pneumatic piston-cylinder unit for uniformly pressing the sealing ring into the annular move said pneumatic cylinder-piston unit having a work piston which is braceable axially on an axial side of the sealing portion of the machine part or the sealing ring; at least one flange part with a support portion that is axially braceable on another axial side of the sealing portion of the machine part or said sealing ring; and a flange portion which for sealing assembly is connectable solidly to a flange portion of a cylindrical part of said piston-cylinder unit, wherein said cylindrical part and said work piston are cup-shaped.

* * * * *